(12) United States Patent
Wu et al.

(10) Patent No.: US 8,240,903 B2
(45) Date of Patent: Aug. 14, 2012

(54) ELECTRONIC DEVICE WITH ILLUMINATED LOGO

(75) Inventors: Zhi-Liang Wu, Shenzhen (CN);
Kenneth Zhao, Taipei Hsien (TW);
Chi-Hsien Fong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 426 days.

(21) Appl. No.: 12/546,633

(22) Filed: Aug. 24, 2009

(65) Prior Publication Data
US 2010/0238667 A1     Sep. 23, 2010

(30) Foreign Application Priority Data
Mar. 17, 2009   (CN) .......................... 2009 1 0300921

(51) Int. Cl.
*F21V 7/04*     (2006.01)

(52) U.S. Cl. ......... 362/602; 362/628; 362/617; 362/612

(58) Field of Classification Search .......... 362/602–605, 362/628, 615, 617, 612, 623, 551, 555, 559, 362/560, 632, 633, 634, 812
See application file for complete search history.

(56) References Cited

U.S. PATENT DOCUMENTS

| | | | |
|---|---|---|---|
| 2004/0085746 A1* | 5/2004 | Chen | 362/26 |
| 2004/0095741 A1* | 5/2004 | Chen | 362/31 |
| 2006/0028841 A1* | 2/2006 | Parker | 362/602 |
| 2006/0203485 A1* | 9/2006 | Fu et al. | 362/237 |

FOREIGN PATENT DOCUMENTS

| | | |
|---|---|---|
| CN | 2785080 Y | 5/2006 |
| CN | 200956230 Y | 10/2007 |

* cited by examiner

*Primary Examiner* — Bao Q Truong
(74) *Attorney, Agent, or Firm* — Altis Law Group, Inc.

(57) ABSTRACT

An electronic device includes a semitransparent housing and a light module. The light module is mounted in the housing, and includes a light source, a light guide, and a light tight shield. The light guide includes a logo. The light tight shield covers the light guide, and defines an opening aligned with and exposing the logo to the housing. Light emitted by the light source illuminates the logo through the light guide and spreads out from the opening. The logo is not visible when not being illuminated.

7 Claims, 4 Drawing Sheets

ELECTRONIC DEVICE WITH ILLUMINATED LOGO

BACKGROUND

1. Technical Field

The present disclosure relates to a luminous electronic device.

2. Description of Related Art

Electronic devices usually include a company logo. Illuminated logo has been invented to make the logo more attractive, however, the logo is still visible when unlit. If the logo can be invisible when unlit, it could be more entertaining to a user of the electronic device.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
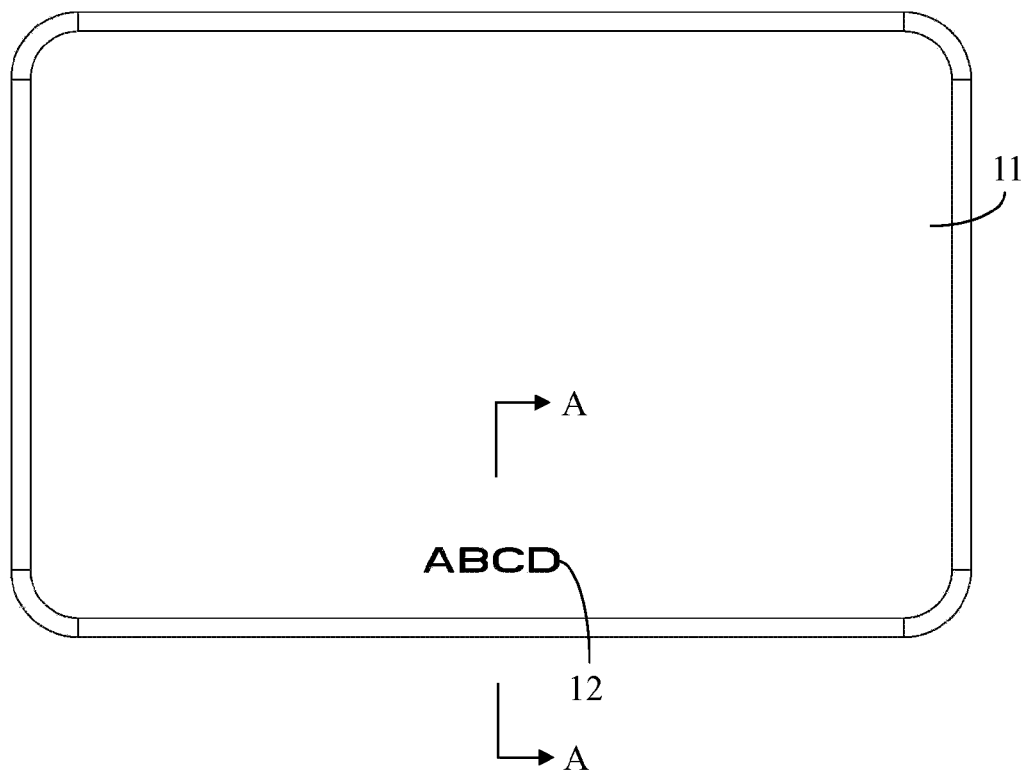
FIG. 1 is a schematic, front view of an electronic device according to an exemplary embodiment.

Referring to FIG. 1, an electronic device 10 according to an exemplary embodiment is disclosed. The electronic device 10 includes a housing 11. The housing 11 can display an illuminated logo 12.

Figure 2:
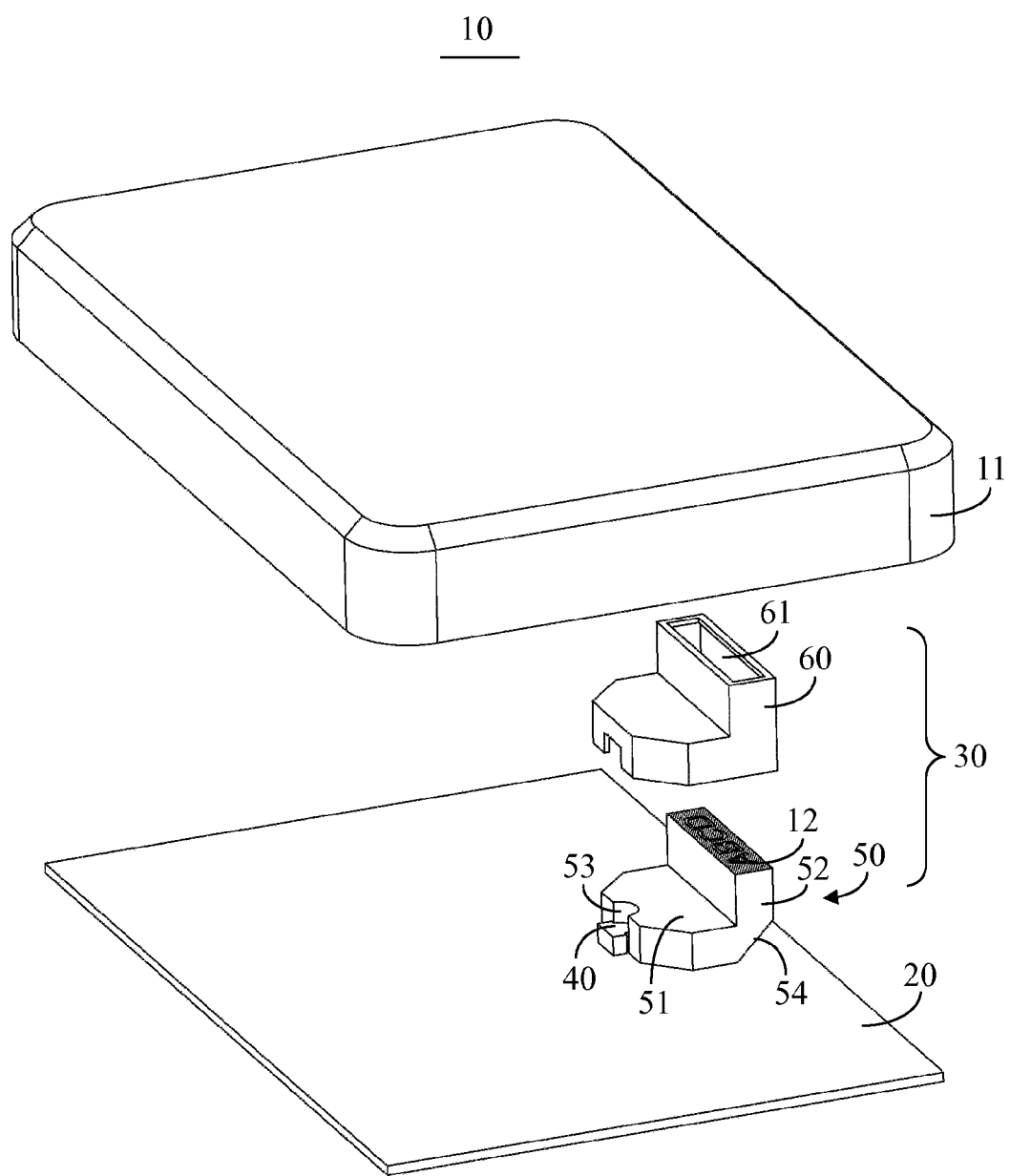
FIG. 2 is an exploded view of the electronic device of FIG. 1.

Referring to FIG. 2, a circuit board 20 is mounted in the housing 11. The circuit board 20 carries electronic components (not shown) and a light module 30.

In this embodiment, the housing 11 is made of transparent plastic and a semitransparent coating is painted on the housing 11. Thus, inner structure of the electronic device 10, such as the circuit board 20 and electronic components carried on the circuit board 20, is not visible from outside the electronic device 10.

The light module 30 includes a light source 40, a light guide 50, and a shield 60. The light source 40 and the light guide 50 are respectively mounted on the circuit board 20.

Figure 3:
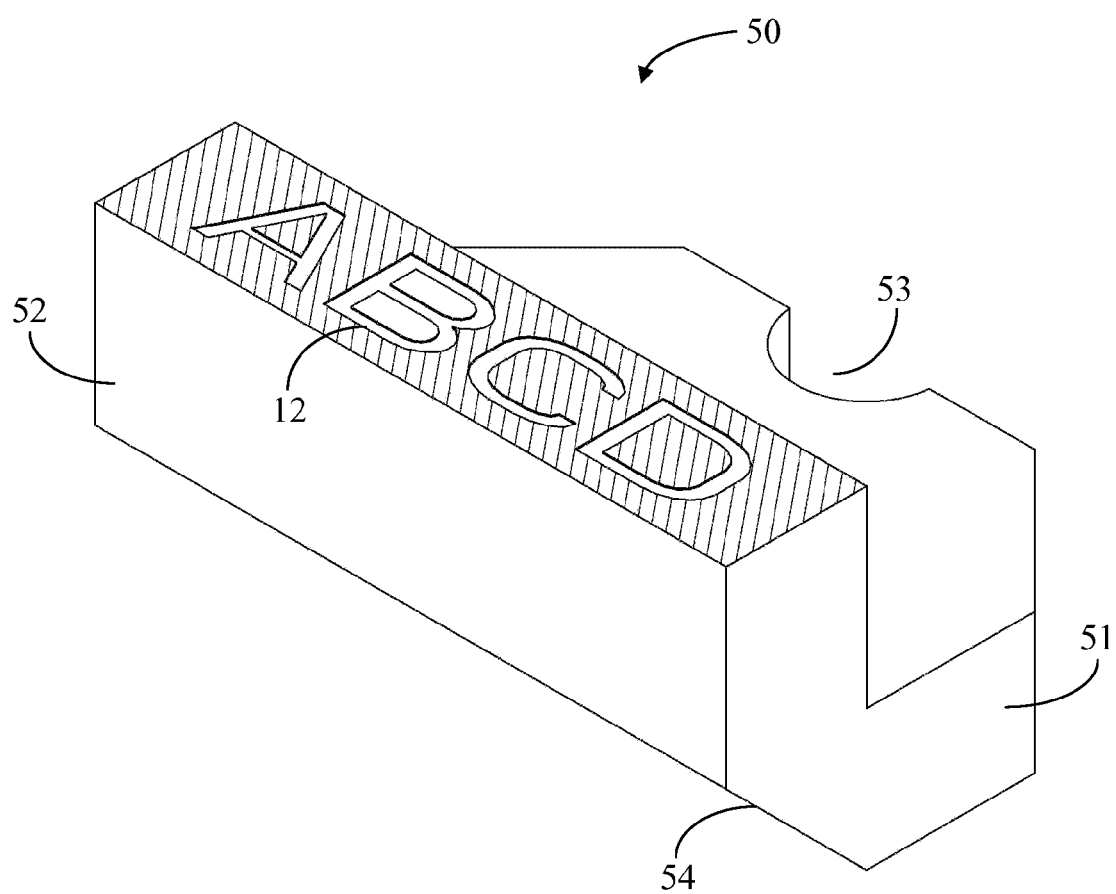
FIG. 3 is a schematic, isometric view of a light guide of the electronic device of FIG. 2.
Figure 4:
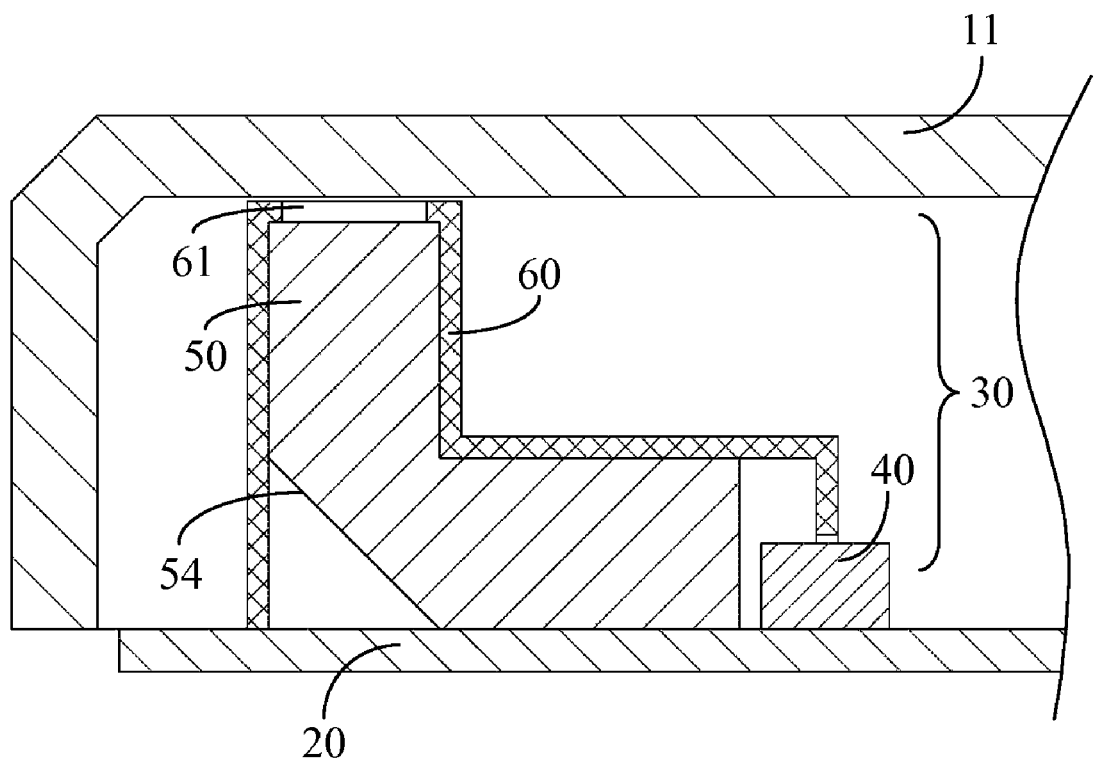
FIG. 4 is a section view along the A-A line of FIG. 1.

Referring to FIGS. 3 and 4, the light guide 50 is L shaped, and includes a horizontal part 51 and a vertical part 52. The horizontal part 51 defines a groove 53 on an end distal to the vertical part 52. The groove 53 receives a part of the light source 40. The vertical part 52 includes a tilted reflective surface 54 on a bottom end thereof. The illuminated logo 12 is set on a top surface of the vertical part 52 by means of, for example, such as, painting and engraving. The illuminated logo 12 is light transmissive. The other part of the top surface of the vertical part 52 is light tight. In this embodiment, the illuminated logo 12 is "ABCD."

The shield 60 covers the light guide 50. The shield 60 is made of light tight material, such as black rubber, and defines an opening 61 aligned with the illuminated logo 12.

When the light source 40 is turned off, the semitransparent housing 11 substantially shields the logo 12 and the inner structure of the electronic device 10, and thus, the logo 12 and the inner structure of the electronic device 10 are not visible outside the electronic device 10.

After the light source 40 is turned on, light emitted by the light source 40 sequentially passes through the horizontal part 51 and the vertical part 52 and illuminates the logo 12, accordingly, the logo 12 becomes visible from outside the electronic device 10. The light further passes through the opening 61 of the shield and the semitransparent housing 11, and emits out of the electronic device 10. As the shield 60 shields the light, the inner structure of the electronic device 10, other than the logo 12, is still not visible. In addition, during the light spreading, the light is also reflected by the reflective surface 54.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
    a semitransparent housing;
    a circuit board mounted in the housing; and
    a light module mounted in the housing, the light module comprising:
        a light source;
        a light guide comprising a logo; and
        a light tight shield sleeving the light guide, and defining an opening aligned with and exposing the logo to the housing, wherein
        the light source and the light guide are mounted on a same side of the circuit board, the light emitted by the light source illuminates the logo through the light guide and spreads out from the opening.

2. The electronic device of claim 1, wherein the housing is made of plastic.

3. The electronic device of claim 1, wherein the shield is made of black rubber.

4. The electronic device of claim 1, wherein the light guide is L shaped and comprises a horizontal part and a vertical part.

5. The electronic device of claim 4, wherein the light guide defines a groove on an end of the horizontal part distal to the vertical part, and the groove is configured for receiving a part of the light source.

6. The electronic device of claim 4, wherein the light guide comprises a tilted reflective surface on a bottom end of the vertical part for reflecting light emitted from the light source.

7. The electronic device of claim 4, wherein the logo is positioned on a top surface of the vertical part.

* * * * *